(12) United States Patent
Rogers

(10) Patent No.: US 6,212,515 B1
(45) Date of Patent: Apr. 3, 2001

(54) METHOD AND APPARATUS FOR POPULATING SPARSE MATRIX ENTRIES FROM CORRESPONDING DATA

(75) Inventor: James P. Rogers, Eden Prairie, MN (US)

(73) Assignee: Platinum Technology, Inc., Islandia, NY (US)

( * ) Notice: Subject to any disclaimer, the term of this patent is extended or adjusted under 35 U.S.C. 154(b) by 0 days.

(21) Appl. No.: 09/185,366

(22) Filed: Nov. 3, 1998

(51) Int. Cl.⁷ .................................................. G06F 17/30
(52) U.S. Cl. ........................ 707/2; 707/3; 707/4; 707/5; 707/6; 707/9; 707/10; 707/100; 707/101; 709/201; 709/203; 711/117; 713/200; 714/117
(58) Field of Search .................................. 707/2, 3–5, 6, 707/9, 10, 100–104, 501, 503; 709/201–203, 219, 229; 713/200, 201, 202; 714/819; 711/117, 149

(56) References Cited

U.S. PATENT DOCUMENTS

| | | |
|---|---|---|
| 5,551,027 | 8/1996 | Choy et al. |
| 5,675,785 | 10/1997 | Hall et al. |
| 5,710,915 | 1/1998 | McElhiney |
| 5,713,020 * | 1/1998 | Reiter et al. ........................ 707/102 |
| 5,761,652 * | 6/1998 | Wu et al. ................................ 707/2 |
| 5,765,147 | 6/1998 | Mattos et al. |
| 5,799,300 * | 8/1998 | Agrawal et al. ........................ 707/5 |
| 5,822,518 * | 10/1998 | Ooki et al. ........................... 713/201 |
| 5,822,751 * | 10/1998 | Gray et al. ............................ 707/3 |
| 5,835,712 * | 11/1998 | DuFresne ............................ 709/203 |
| 5,940,818 * | 8/1999 | Malloy et al. .......................... 707/2 |
| 5,974,418 * | 10/1999 | Blinn et al. ......................... 707/100 |
| 5,978,788 * | 11/1999 | Castelli et al. ......................... 707/2 |
| 5,978,796 * | 11/1999 | Malloy et al. .......................... 707/3 |
| 5,991,754 * | 11/1999 | Raitto et al. .......................... 707/2 |
| 6,003,024 * | 12/1999 | Bair et al. .............................. 707/3 |
| 6,003,036 * | 12/1999 | Martin ................................ 707/102 |

OTHER PUBLICATIONS

Albrecht, J. et al., "Management of Multidimensional Aggregates for Efficient Online Analytical Processing," Proceedings of the 1999 International Symposium on Database Engineering and Applications, IDEAS '99, Aug. 2–4 1999, pp. 156–164.*

Krippendorf, Michael et al., "The Translation of Star Schema into Entity–Relationship Diagrams," Proceedings of the Eighth International Workshop on Database and Expert Systems Applications, Sep. 1–2, 1997, pp. 390–395.*

Platinum Technology, "InfoBeacon & Relational OLAP What's Inside of InfoBeacon, and Why You Should Care," Jun. 1997.

Gupta, "Aggregate–Query Processing in Data Warehousing Environments," Zurich, Switzerland 1995, Proceedings of the 21st VLDB Conference.

Database Programming & Design, Divide and Aggregate: Designing Large Warehouses, Jul.,1998Mar. 8, 2000.

* cited by examiner

*Primary Examiner*—Hosain T. Alam
*Assistant Examiner*—Shahid Alam
(74) *Attorney, Agent, or Firm*—Piper Marbury Rudnick & Wolfe

(57) ABSTRACT

A system is provided for selecting an appropriate aggregated fact data table to use as the basis for calculating an aggregation request from a set of stored aggregated fact data tables. An estimate is established of the amount of processing time required to aggregate each of the tables. The table with the lowest estimate is then used to perform the aggregation.

8 Claims, 5 Drawing Sheets

FIG 2B

REQUESTED LEVEL

|  | | DETAIL | CITY | STORE TYPE | STATE | DISTR. SOURCE | REGION |
|---|---|---|---|---|---|---|---|
| STORED LEVEL | DETAIL | X | X | X | X | X | X |
| | CITY | | X | | X | X | X |
| | STORE TYPE | | | X | | | |
| | STATE | | | | X | | X |
| | DISTR. SOURCE | | | | | X | |
| | REGION | | | | | | X |

FIG 3A

| Customer Levels | Members |
|---|---:|
| Total US | 1 |
| Region | 5 |
| District | 20 |
| Customer | 2000 |

FIG 3B

| Period Levels | Members |
|---|---:|
| Year | 1 |
| Month | 12 |
| Day | 365 |

FIG 4

|  | 1 – Day | 2 - Month | 3 - Year |
|---|---|---|---|
| 4 – Total US<br>3 – Region<br>2 – District<br>1 – Customer | Physical P2<br><br><br>Physical P1 | <br><br>Physical P3<br> | Virtual V1 (on P1)<br><br><br> |

FIG 5

| Intersection | Partition "Bids" | | | | Queried |
|---|---|---|---|---|---|
| | P1 | P2 | P3 | VP1 | Partition |
| 1,1 Customer - Day | 1 | na | na | na | P1 |
| 1,2 Customer - Month | 30.42 | na | na | na | P1 |
| 1,3 Customer - Year | 365 | na | na | na | P1 |
| 2,1 District - Day | 100 | na | na | na | P1 |
| 2,2 District - Month | 3042 | na | 1 | na | P3 |
| 2,3 District - Year | 36500 | na | 12 | na | P3 |
| 3,1 Region - Day | 400 | 1 | na | na | P2 |
| 3,2 Region - Month | 12168 | 30.42 | 4 | na | P3 |
| 3,3 Region - Year | 146000 | 365 | 48 | 1 | P1 |
| 4,1 Total US - Day | 2000 | 5 | na | na | P2 |
| 4,2 Total US - Month | 60840 | 152.1 | 20 | na | P3 |
| 4,3 Total US - Year | 730000 | 1825 | 240 | na | P3 |

METHOD AND APPARATUS FOR POPULATING SPARSE MATRIX ENTRIES FROM CORRESPONDING DATA

BACKGROUND OF THE INVENTION

The present invention relates to databases and in particular to data aggregation on demand.

In the field of data warehousing, members of an organization will frequently need to summarize, or aggregate, vast quantities of data at various different levels of summarization within various stored dimensions.

A level of data in a dimension of a database is a grouping of the entries in that dimension. For example, if a dimension consists of different stores, the stores could be grouped at a city level, a state level, or any other conceivable level.

Different people will frequently wish to obtain the same summarized data at different times. Rather than querying the data in the data warehouse and aggregating the data every time aggregated data is required, it has become common practice to pre-aggregate data at various commonly queried levels of aggregation and store the aggregated data in the database for easy retrieval in what is referred to as a partition. The levels which are pre-aggregated and stored in this fashion are often defined by the system administrator. When further aggregations are performed at the request of a user, these might also be stored in a partition to be retrieved at a later date.

A problem with such storage of partitioned data is that when a request is made for data at a certain level aggregation which has not already been generated, the aggregation must be carried out using detail level data, despite the fact that the data might actually be stored at a hierarchically marginally lower level, and easily be aggregated further to the level in question. Levels are hierarchically above or below one another if all the detail records associated with any particular member of the lower level are also associated with a single member of the higher level. For example, a city level grouping of stores is hierarchically below a state level grouping of stores, as all stores in a particular city will also be in a particular state (assuming no cities lie across a state border). However, a "store size" level will normally not be hierarchically above or below a state level, as there is no reason for there to be a correlation between store size and state.

To overcome the problem of always having to resort to the detail level data to perform a new aggregation, it has become common practice to define virtual partitions for intersections which do not actually store data at a particular level, but instead present the outward appearance of holding the data at a certain level of aggregation, and are provided with the functionality to aggregate data from one or more lower level physical partitions which are stored. The virtual partitions are pre-programmed as to which physical partition data to use for aggregation.

However, for systems with a large number of dimensions and a significant number of levels in each dimension, the number of virtual partitions which must be defined can be prohibitive—both from an administrative perspective and a search/query perspective. If a virtual partition is to be maintained for each possible set of levels across all the dimensions, the number of virtual partitions which require storing is the product of the number of levels in each dimension. For example, a system with 6 dimensions each with 5 levels and 2 dimensions each with 7 levels results in a matrix of 765,625 cells.

What is required is a system to allow the server handling queries to choose the best partition from which to aggregate data "on the fly" without maintaining a database of appropriate partitions to aggregate from.

SUMMARY OF THE INVENTION

The present invention provides a method for creating aggregations to higher levels using aggregations over the same dimensions already created at lower levels. A system is provided which allows a measure of processing "cost" to be ascertained for each physical partition of the data stored to satisfy the request, and the aggregation is then performed using the partition which is ascertained to have the lowest cost. The detail level data may be classified as a partition. Otherwise, if no partition can provide the data at the required level, or if the lowest cost is greater than the cost of performing the aggregation from the detail level data, the aggregation is performed using the detail level data.

According to one aspect of the invention, an object is associated with each stored aggregation of the stored data. The object can be polled based on a set of levels which are required in a set of dimensions. The object then responds to this query with a bid representing the amount of processing which will be required to aggregate the data it is associated with to the required level. The requesting object will ask the aggregate object returning the lowest bid to perform the aggregation and return the appropriate aggregate data. Equivalent operation could be achieved by storing the meta-data defining the data stored in the physical partitions in an appropriate data structure, and polling this data structure to ascertain which partition to use to perform the aggregation.

According to another aspect of the invention, the bid returned is calculated by multiplying together the "distance" for each required dimension, where distance is the ratio of the number of entries in the requested level to the number of entries in the stored level.

According to another aspect of the invention, the bid returned is calculated by calculating the difference between the estimated or actual number of entries in the stored data and the estimated number of entries which will be present in the aggregated data.

BRIEF DESCRIPTION OF THE DRAWINGS

FIG. 2B shows the dimension hierarchy of FIG. 2A in a different format.

FIG. 3A and FIG. 3B show two dimensions in an example of the operation of the first embodiment of the invention.

FIG. 4 shows a level cross product of the example dimensions shown in FIGS. 3A and 3B.

FIG. 5 shows the results of the operation of the first embodiment of the invention for various requests on fact tables using the dimension data shown in FIGS. 3A and 3B and the partitions shown in FIG. 4.

DETAILED DESCRIPTION

A specific embodiment of the invention is hereinafter described with reference to FIGS. 1 and 2.

Figure 1:
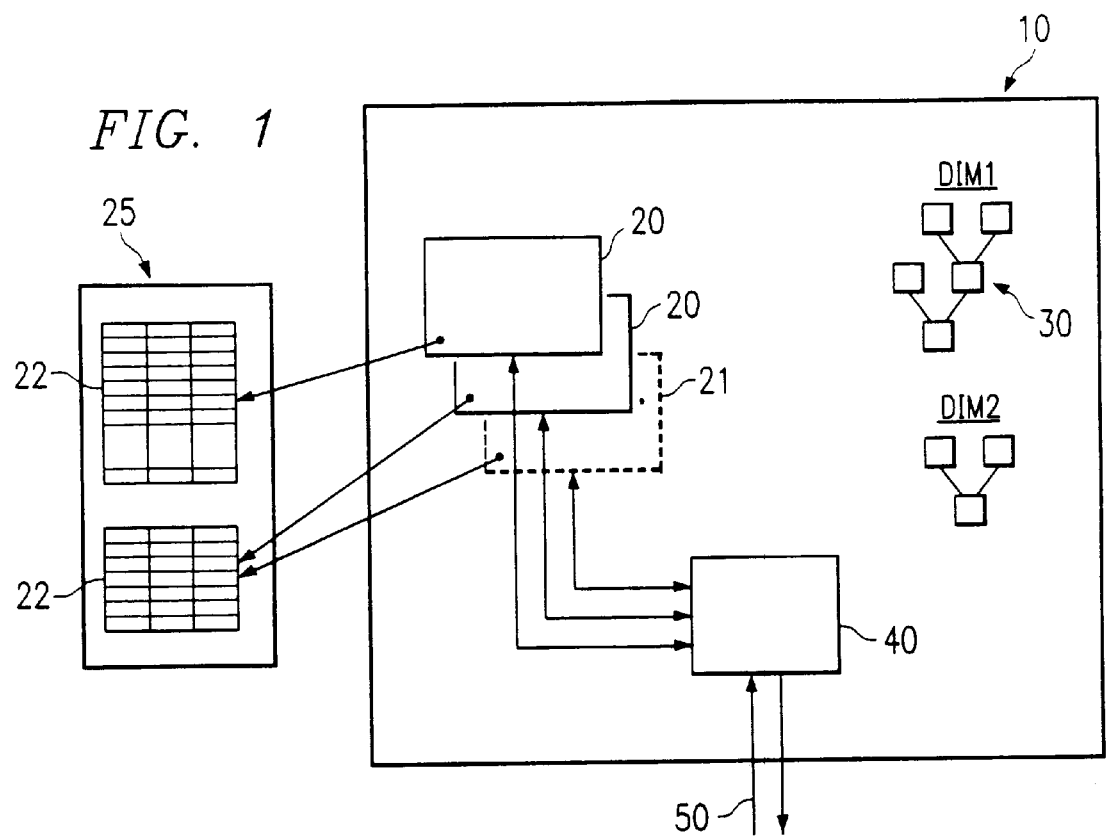
FIG. 1 shows an application server in accordance with a first embodiment of the invention.

FIG. 1 shows an application server 10 in accordance with the first embodiment of the invention which holds partition objects 20, each of which represents a physical partition 22 in a database 25. The application server 10 also holds a data providing object 40 which can handle requests for aggregated data from fact data stored in the partition objects 20.

The following information is available to the application server 10, and is defined by the system administrator for each dimension stored in the database:

a) The levels in the dimension.

b) The level hierarchy or hierarchies 30 within the dimension.

c) The number (estimated, or determined at certain times, eg. when changes are made to the dimension tables) of members within each level.

d) the defining attributes of each level

Various physical data partitions 22 are stored in the database 25, and more will be created with operation of the system, as will become apparent. The physical partitions are essentially tables which store fact data from the database at specified levels of summarization in each of the dimensions the data therein represents. The partition objects 20, each associated with a physical partition, are provided with the following data:

a) The levels of each dimension which are stored in the associated partition b) the measures which are stored in the table.

c) the rows (by attribute value) from each of the levels which are stored in the table (eg. East or West Regions, 1995 or 1996 periods etc.)

A data providing object 40 on the application server 10 is equipped to receive requests 50 for data representing selecting measures at an intersection of specified levels from a set of dimensions. Actual requests might require data to be returned from several intersections, in which case the process described herein will be carried out for each intersection. For example, a request including Brands and Sizes, Months and Quarters, and Regions would require the following intersections: Brand-Month-Region, Size-Month-Region, Brand-Quarter-Region and Size-Quarter-Region. For each level intersection required, the data providing object 40 makes a request to each of the partition objects 20, passing the requirements as parameters to the partition objects. Each of the objects then analyses the requested data as will be discussed in more detail below and returns a bid representing the processing cost for generating the required aggregation from the physical partition associated therewith. If a partition cannot satisfy the request, an infinite cost will be returned.

Special partition objects 21 could be set up to force certain intersection requests to use predetermined partitions 22 by returning a very low bid. This might be appropriate if a certain optimization, such as a particular indexing scheme, was available to enhance aggregation for a certain set of levels to another higher set of levels.

The data providing object then collects up all the bids from the partition objects and selects the object returning the lowest bid to perform the aggregation. The data providing object 40 then requests the object in question to perform the aggregation, which in turn submits an appropriate query to the database to obtain the aggregated data and then returns the aggregated table.

For example, assume there is a time dimension stored in a table called "TimeTable" at levels day, month and quarter, and a dimension of branches stored in a table called "Branches" including branch, district and region levels. Furthermore, assume that each dimension table does not just include entries representing the entities represented by the dimension, but also includes entries representing each of the level members in that dimension; each entry has a "level" field identifying the level of the level member associated with the entry in question. Such a set of fields in the dimension table simplifies the query which needs to be generated, and the following query could be set up to obtain data at the Region-Quarter level from a table StoredTable with data stored at the district-month levels:

SELECT Branches.Region AS Region, TimeTable.Quarter AS Quarter,
SUM(StoredTable.Sales) AS Sales FROM
StoredTable, Branches, TimeTable WHERE
StoredTable.District=Branches.District AND
StoredTable.Month=TimeTable.Month AND
Branches.Level="District" AND
TimeTable.Level="Month"
GROUP BY Branches.Region, TimeTable.Quarter;

The data providing object 40 then returns this table as the result of the original request. The server could also create another partition 22 and associated partition object 20 with the data from the table, so that if the request is made again, the data is immediately available. Furthermore, the newly created partition could also be used to aggregate data to a higher level if requested.

Figure 2A:
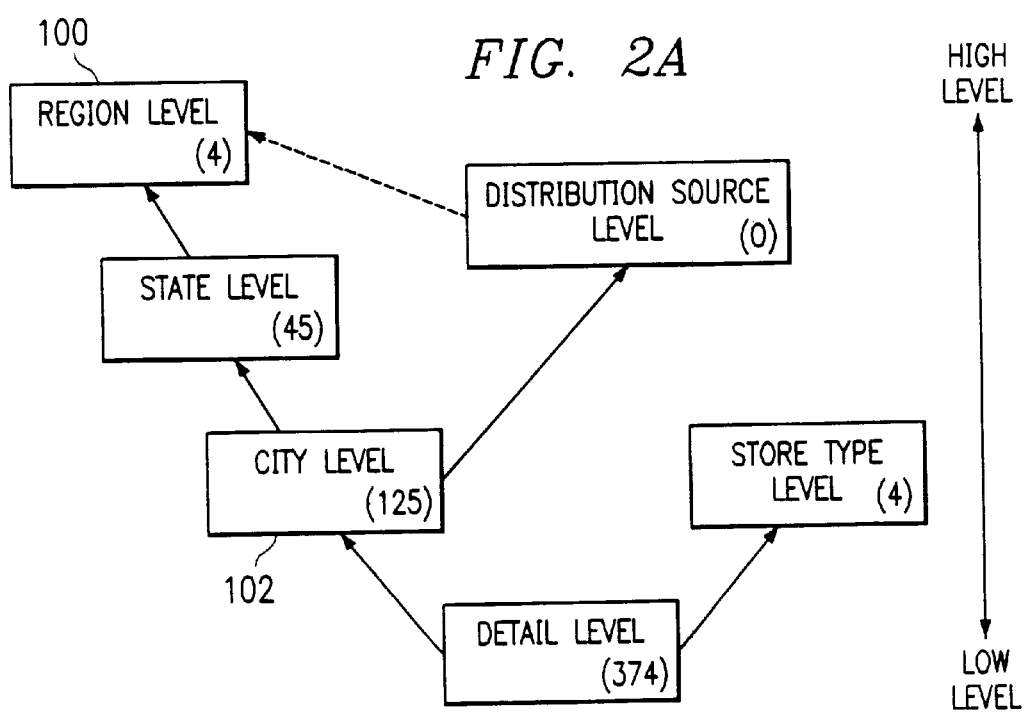
FIG. 2A shows an example of a dimension hierarchy.

The algorithm which is used by each partition object 20 to calculate the cost is as follows. The partition object, on receiving the parameters for the aggregate request, also obtains from the server the dimension level hierarchy for each dimension called, an example of which is shown in FIG. 2A. For each dimension, the level stored in the object is identified in the hierarchy, along with the level being requested. In the example shown in FIG. 2A, the level being requested is the region level 100, and the stored level is the city level 102. The dimension hierarchy is then checked to see if the requested level can be reached by travelling up along branches from the requested stored level. It should be noted that the hierarchy is not necessarily a tree, as different branches could join back together at higher levels if different lower levels can all be classified into the same higher level. For example, the distribution source level could be hierarchically below the region level, as shown by a dotted line in FIG. 2A, although the distribution level is not above or below the state level, for example because two different distribution sources might distribute to different cities in the same state.

The dimension hierarchy for each dimension could be represented as an array with the stored level as one array dimension, and the requested level as the other. An entry is flagged if the requested level can be generated from the stored level, as shown in FIG. 2B.

If the stored level is hierarchically lower than the requested level, a measure of the "distance" between the two levels is calculated. The distance between two levels is defined as the ratio of the number of members in the stored level to the number of members in the requested level. The number of members in each level is shown in FIGS. 3A and 3B.

If the stored level is not hierarchically lower than the requested level, an infinite distance is returned for that dimension, which will in turn lead to an infinite cost being returned by the object as will become apparent.

Once the distances for all dimensions have been calculated, these are multiplied together to give the overall bid for that object. If the levels stored could not be aggregated to the levels requested in any particular dimension, the infinite distance returned by that dimension will lead to an infinite cost being returned by the object, as one of the parameters in the multiplication will be an infinite value.

It can be seen that the ratio of the number of members in the two levels is a suitable measure of the distance, rather than, for example the difference between the number of keys in the two levels for the following reason. The critical value which determines the processing power required by each partition to satisfy the request is the difference between the number of entries in the partition object and the number of entries in the aggregated table, because each aggregation operation will decrease the number of entries by one. For example, three entries being aggregated into one entry will take approximately two aggregation operations (e.g. additions) of the stored measures. The number of entries in the aggregated table is constant for all the bidding objects, as they would all return the same aggregated data. Therefore, it is only the number of entries in the partition object which is relevant for calculating the approximate processing time for the aggregation. This value correlates with the ratio returned for the following reason:

If $R_1, R_2, \ldots R_n$ are the number of key values in the requested n dimensions, and $S_1, S_2, \ldots S_n$ are the number of key values in the dimensions of the physical partition in question, the equation for the bid value is as follows:

$$bid = \frac{S_1}{R_1} \times \frac{S_2}{R_2} \times \ldots \times \frac{S_n}{R_n} \qquad (1)$$

$R_1 * R_2 * \ldots R_n$ is a constant value in all cases, so:

$$bid = \frac{S1 \times S2 \times \ldots \times Sn}{K} \approx \frac{Stored\ Entries}{k} \qquad (2)$$

so the bid returned is proportional to the approximate number of stored entries in the dimension and gives a good estimate for the cost of performing the aggregation relative to the other partitions.

To illustrate this, consider a requested partition with two dimensions. The number of members of the requested levels in the two dimensions are 50 and 3 respectively.

A physical partition is stored with 100 level members at the stored level in the first dimension and 4 level members at the stored level in the second. Assuming the partition is fairly densely populated, there will be close to 400 entries in the partition data which need to be aggregated into approximately 150 entries in the requested partition. The bid returned will be 2.67.

Another physical partition is stored with 67 level members at the stored level in the first dimension and 6 level members at the stored level in the second. Assuming the partition is fairly densely populated, there will also be close to 400 entries in the partition data which need to be aggregated into approximately 150 entries in the requested partition, so the processing power to aggregate this partition will be approximately equal to the processing power required to aggregate the other partition. The returned bid in this case is similarly 2.68, which is appropriate, as the two partitions should take approximately the same processing power to perform the aggregation.

It should be noted that this is not proportional to the absolute processing cost of the aggregation, because the absolute cost is approximately proportional to $(S_1 * S_2 * \ldots S_n) - (R_1 * R_2 * \ldots R_n)$, the difference between the number of stored entries and the number of requested entries. For example, it will take tens of times more processing to aggregate 400 entries to 199 entries than to aggregate 200 entries to the same 199 entries (which would only require one aggregation operation), but the bid returned in the latter case would be twice as large.

Clearly the bidding algorithm could be changed heuristically to take into account known patterns, known strengths in the aggregation algorithms and possible sparsity in the partitions.

If one or more of the dimensions associated with the stored data are not specified, the request is considered as if the dimension were requested at the "all data" level—a level with one member of which all the entities of a dimension are associated. If a partition has the data stored at a lower level in this dimension, the ratio returned for this dimension will appropriately be the number of key values in the stored level (divided by unity), so the bid will accurately reflect the amount of aggregation required.

It should be noted that different levels of data might be stored on different databases or on the application server itself. The partition objects associated with each partition 25 are provided with the necessary knowledge of how to poll the appropriate database to retrieve data at any particular level.

An example of the operation of the bidding system will now be given with reference to FIGS. 3 to 5. In this example, there are two dimensions, Customers and Periods, which contain the levels shown in FIGS. 3A and 3B. There are three physical partitions 22 stored in the database 25. Partition P1 contains Daily Customer data, P2 contains Monthly District data and P3 contains Daily Region data.

There are 12 possible level intersections that can be requested. Because only 3 of these intersections actually exist, the matrix of intersections is said to be a sparse matrix. This matrix is diagramed in FIG. 4. The empty cells in FIG. 4 indicate level intersections that have to be generated "on-the-fly." Using the previous techniques, to take advantage of the stored partitions, an entry would have to be set up for each of the possible intersections to specify which partition to use. Virtual partitions would have had to be set up to force the server to use certain phyiscal partitions. For example, the intersection 3,3 includes an indication that the system administrator has set up a virtual partition to force the server to use physical partition P1 when creating Yearly—Region records.

Using the method of the invention, setting up a matrix of every possible level inrtersection can be avoided by simply directly polling the objects representing each of the phyical partitions, and any virtual partitions defined.

The algorithm described above is used to determine, for any requested intersection, which physical partition should be queried to satisfy the request. This is done by determining, based on the members within each level, how many members would have to be aggregated within each dimension to create the requested intersection. FIG. 5 is a diagram indicating, for each possible level intersection, what each physical partition object's bid would be, and, given these bids, which partition would be queried to satisfy the request. In this example, the virtual partition object V1 forces the physical partition P1 by returning a bid of 1 if a request is made for yearly-region records.

According to a second embodiment of the invention, the physical partitions are not required to contain all the data in the fact set represented. For example, one physical partition might only contain all products sold in the east region in 1997, and one might contain all products sold in the west region in 1997. This might be done for reasons of storage efficiency, or because many requests that are made request only the west region or east region, and results for such requests can be returned more efficiently by only having to analyze the data from the appropriate region without the extraneous data from other regions. The data providing object is provided with information, either from an internal representation, or from data returned by the partition objects, concerning which members of the levels associated with a level are stored by each partition. If two or more partitions between them can fulfill a request (eg. one has east region data, and one has west region data), they will all return the same bid, and the data providing object will request each of the partitions to aggregate the data therein. The data providing object will then combine the data returned by all of these objects and output this data appropriately.

While preferred embodiments of the present invention have been illustrated and described, it will be understood by those of ordinary skill in the art that changes and modifications can be made without departure from the invention in its broader aspects. Various features of the present invention are set forth in the following claims.

What is claimed is:

1. A system for aggregating data comprising:

means for storing data in fact data tables at one of a plurality of levels in a plurality of dimensions;

means for providing an estimate of the amount of processing required to aggregate each fact data table to a requested set of levels from a set of plural dimensions;

means for selecting the fact data table associated with the lowest estimate with which to perform the aggregation; and means for aggregating the data in the selected fact data table.

2. A system for aggregating data in accordance with claim 1, wherein said means for providing an estimate comprises partition objects, each of which includes information relating to one of said data tables, and each of which is provided with functionality to return a bid in response to a request for data at said set of levels, the value of the bid being a function of the requested set of levels and the stored set of levels.

3. A system in accordance with claim 1 wherein the estimate returned is proportional to the product over all requested dimensions of the ratio, in each dimension, of the number of members in the stored level to the number of members in the requested level.

4. A method for aggregating data comprising:

storing data as fact data table objects at one of a plurality of levels in a plurality of dimensions;

providing an estimate of the amount of processing required to aggregate each fact data table object to a requested set of levels from a set of plural dimensions;

selecting the fact data table object returning the lowest estimate with which to perform the aggregation; and aggregating the data in the selected fact data table object.

5. A method in accordance with claim 4, wherein said step of providing an estimate comprises sending a request for a bid to a partition object, said partition object including information relating to one of said data tables, including the set of levels stored therein, and said partition object furthermore being provided with functionality to return a bid in response to a request for data at said set of levels, the value of said bid being a function of the requested set of levels and the stored set of levels.

6. A system in accordance with claim 5 wherein the estimate returned is proportional to the product over all requested dimensions of the ratio, in each dimension, of the number of members in the stored level to the number of members in the requested level.

7. A method in accordance with claim 4 wherein if one of said fact data tables contains a virtual partition forcing use of a predetermined fact data table, aggregating the data in said predetermined fact data table to the requested set of levels.

8. A system for aggregating data comprising:

a data store module for storing data in fact data tables at one of a plurality of levels in a plurality of dimensions;

an aggregate estimator providing an estimate of the amount of processing required to aggregate each fact data table to a requested set of levels from a set of plural dimensions;

wherein the data in a selected fact data table having the lowest estimated aggregation processing is aggregated.

* * * * *